(12) United States Patent
Suzuki et al.

(10) Patent No.: US 12,135,030 B2
(45) Date of Patent: *Nov. 5, 2024

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/012,856

(22) PCT Filed: Jul. 1, 2021

(86) PCT No.: PCT/JP2021/024941
§ 371 (c)(1),
(2) Date: Dec. 23, 2022

(87) PCT Pub. No.: WO2022/009768
PCT Pub. Date: Jan. 13, 2022

(65) Prior Publication Data
US 2023/0258181 A1    Aug. 17, 2023

(30) Foreign Application Priority Data

Jul. 6, 2020  (JP) ................................. 2020-116357

(51) Int. Cl.
*F04C 29/00*  (2006.01)
*F04C 18/02*  (2006.01)
(Continued)

(52) U.S. Cl.
CPC .......... *F04C 29/0021* (2013.01); *F04C 18/02* (2013.01); *F04C 27/001* (2013.01);
(Continued)

(58) Field of Classification Search
CPC ................ F16C 17/045; F16C 33/1015; F16C 33/1065; F16C 33/107; F16C 2360/42;
(Continued)

(56) References Cited

U.S. PATENT DOCUMENTS 1,876,515 A    9/1932  Emmet et al.
2,244,450 A    6/1941  Erni
(Continued)

FOREIGN PATENT DOCUMENTS

CN    1245552    2/2000   ............... F16J 15/34
CN    2460801    11/2001  ............... F16J 15/40
(Continued)

OTHER PUBLICATIONS

International Search Report and Written Opinion issued in PCT/JP2021/024940, dated Aug. 10, 2021, with English translation, 13 pages.
(Continued)

*Primary Examiner* — Mark A Laurenzi
*Assistant Examiner* — Xiaoting Hu
(74) *Attorney, Agent, or Firm* — HAYES SOLOWAY P.C.

(57) ABSTRACT

Provided is a sliding component capable of stably reducing the frictional resistance of a sliding surface entailing eccentric rotation. A sliding component has an annular shape with high-pressure and low-pressure fluids facing inside and outside of the sliding component and has a sliding surface relatively sliding with eccentric rotation. The sliding surface is provided with a plurality of high-pressure grooves open to a space in which the high-pressure fluid exists and a plurality (Continued)

of low-pressure grooves open to a space in which the low-pressure fluid exists. The high-pressure and low-pressure grooves are arranged in a circumferential direction.

16 Claims, 11 Drawing Sheets

(51) Int. Cl.
  *F04C 27/00* (2006.01)
  *F04C 29/02* (2006.01)
  *F16C 17/04* (2006.01)
(52) U.S. Cl.
  CPC ............ *F04C 27/008* (2013.01); *F04C 29/00* (2013.01); *F16C 17/045* (2013.01); *F04C 18/0215* (2013.01); *F04C 29/028* (2013.01); *F04C 2240/50* (2013.01); *F04C 2240/54* (2013.01); *F04C 2240/801* (2013.01); *F16C 2360/42* (2013.01)
(58) Field of Classification Search
  CPC .. F16C 32/0659; F16C 2360/00; F16C 17/04; F16C 17/08; F04C 18/02–0292; F04C 2240/54; F04C 2240/50; F04C 2240/801; F04C 27/005; F04C 27/008; F04C 29/0021; F04C 15/0023; F04C 15/0034; F04C 15/0042; F04C 29/0057; F04C 15/0065; F04C 18/0207–0292; F04C 2/025; F04C 15/0088; F04C 29/02; F04C 29/028; F04C 2/02–077; F01C 1/02–0292; F01C 21/02; F01C 19/08; F01C 19/12
  See application file for complete search history.

(56) References Cited

U.S. PATENT DOCUMENTS

| | | | |
|---|---|---|---|
| 3,380,040 A | 4/1968 | Liggett | F16C 17/045 |
| 3,383,116 A | 5/1968 | Carter | 277/96 |
| 3,527,465 A | 9/1970 | Guinard | |
| 3,675,935 A | 7/1972 | Ludwig | F16J 15/342 |
| 3,695,789 A * | 10/1972 | Jansson | F01C 21/003 |
| | | | 418/133 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 272/3 |
| 4,889,348 A | 12/1989 | Amundson | 277/306 |
| 5,071,141 A | 12/1991 | Lai et al. | |
| 5,092,612 A * | 3/1992 | Victor | F16J 15/3412 |
| | | | 277/400 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,316,455 A | 5/1994 | Yoshimura | F04C 29/0021 |
| 5,447,316 A | 9/1995 | Matsui | 277/400 |
| 5,556,111 A | 9/1996 | Sedy | 277/400 |
| 5,558,341 A | 9/1996 | McNickle | 27/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,666 B2 * | 2/2017 | Ferris | F16J 15/3412 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,053,975 B2 | 7/2021 | Imura | F16C 17/045 |
| 11,248,706 B2 | 2/2022 | Imura | F16C 33/74 |
| 11,320,052 B2 | 5/2022 | Imura et al. | F16J 15/34 |
| 11,913,454 B2 | 2/2024 | Suzuki | F04C 29/00 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0135957 A1 | 6/2005 | Park | F04C 18/0215 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0194966 A1 | 8/2011 | Takeuchi | F04B 18/0215 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2013/0323105 A1 | 12/2013 | Chao et al. | F04C 29/028 |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0294330 A1 | 10/2014 | Tokunaga | F16C 17/04 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0184752 A1 * | 7/2015 | Itadani | F16J 15/3412 |
| | | | 277/400 |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0089467 A1 * | 3/2017 | Young | F01D 11/003 |
| 2017/0146014 A1 | 5/2017 | Ohta et al. | F04C 29/0021 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |

(56) References Cited

U.S. PATENT DOCUMENTS

| | | | |
|---|---|---|---|
| 2018/0299015 A1 | 10/2018 | Itadani | F16J 15/3448 |
| 2019/0169988 A1 | 6/2019 | Tokunaga et al. | F01C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0141444 A1 | 5/2020 | Thatte | F16C 17/08 |
| 2020/0224722 A1 | 7/2020 | Imura | F16C 33/743 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0116032 A1 | 4/2021 | Kimura | F16J 15/188 |
| 2021/0364034 A1 | 11/2021 | Okada | F16J 15/342 |
| 2022/0056949 A1 | 2/2022 | Ikeda et al. | F16C 17/04 |
| 2023/0027772 A1 | 1/2023 | Suzuki et al. | F16C 17/02 |
| 2023/0258182 A1 | 8/2023 | Suzuki | F04C 18/0215 |

FOREIGN PATENT DOCUMENTS

| | | | |
|---|---|---|---|
| CN | 1401924 | 3/2003 | F16J 15/16 |
| CN | 1529063 | 9/2004 | F16C 33/10 |
| CN | 1607710 | 4/2005 | F16C 17/08 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 205244387 | 5/2016 | F16J 15/16 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 108131386 | 6/2018 | F16C 17/10 |
| CN | 109237042 | 1/2019 | F16J 15/34 |
| CN | 110770456 | 2/2020 | F16C 33/12 |
| CN | 110925426 | 3/2020 | F16J 15/16 |
| CN | 111656065 | 9/2020 | F16J 15/34 |
| DE | 3223703 | 6/1982 | F16J 15/34 |
| DE | 10048256 | 9/2000 | F16C 33/06 |
| DE | 102008038396 | 2/2010 | |
| EP | 0369295 | 11/1988 | F16J 15/34 |
| EP | 0589514 | 9/1992 | B21J 5/12 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 3575621 | 12/2019 | F16C 33/10 |
| EP | 3575643 | 12/2019 | F16J 15/34 |
| EP | 3650722 | 5/2020 | F16C 33/12 |
| FR | 2342440 | 9/1997 | F16J 15/34 |
| GB | 1509482 | 5/1978 | F16C 33/10 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |
| JP | S59-195253 | 12/1984 | F16J 15/34 |
| JP | S59-195254 | 12/1984 | F16J 15/34 |
| JP | S61-8402 | 1/1986 | F01C 1/01 |
| JP | S63-134883 | 6/1988 | F04C 18/02 |
| JP | S63-190975 | 8/1988 | F16J 15/34 |
| JP | H02-16381 | 1/1990 | F04C 18/02 |
| JP | H02-236067 | 9/1990 | F16J 15/34 |
| JP | H02-136863 | 11/1990 | F16J 15/34 |
| JP | H04-50559 | 2/1992 | F16J 15/34 |
| JP | H04-337165 | 11/1992 | F16J 15/34 |
| JP | H04-362289 | 12/1992 | F04C 18/02 |
| JP | H05-60247 | 3/1993 | F16J 15/34 |
| JP | H05-296248 | 11/1993 | |
| JP | H05-90049 | 12/1993 | F16J 15/34 |
| JP | H06-17941 | 1/1994 | F16J 15/34 |
| JP | H06-117547 | 4/1994 | F16J 15/34 |
| JP | H06-174107 | 6/1994 | F16J 15/34 |
| JP | H6200927 | 7/1994 | F16J 17/02 |
| JP | H06-323442 | 11/1994 | F16J 15/34 |
| JP | H06-105105 | 12/1994 | F16J 15/34 |
| JP | H07-43038 | 5/1995 | F16J 15/34 |
| JP | 9-89119 | 3/1997 | F16J 15/34 |
| JP | H09228968 | 9/1997 | F01C 17/06 |
| JP | H09228968 A * | 9/1997 | |
| JP | 9-292034 | 11/1997 | F16J 15/34 |
| JP | H10-281299 | 10/1998 | F16J 15/34 |
| JP | H10-292867 | 11/1998 | |
| JP | H10-339286 | 12/1998 | F04C 18/02 |
| JP | H11-132163 | 5/1999 | F04C 18/02 |
| JP | H11-287329 | 10/1999 | F16J 15/34 |
| JP | H11-303858 | 11/1999 | F16C 17/10 |
| JP | 3066367 | 5/2000 | F16J 15/34 |
| JP | 2001-12458 | 1/2001 | F16C 17/10 |
| JP | 2003-343730 | 12/2003 | F16J 15/22 |
| JP | 2004-360903 | 12/2004 | F16J 15/447 |
| JP | 2005-155894 | 6/2005 | F16C 17/04 |
| JP | 2005-180652 | 7/2005 | F16J 15/34 |
| JP | 2005-315391 | 11/2005 | |
| JP | 2005-337503 | 12/2005 | F16J 15/34 |
| JP | 2006-9614 | 1/2006 | F04C 18/08 |
| JP | 2006-77899 | 3/2006 | F16J 15/34 |
| JP | 2006-90524 | 4/2006 | F16C 17/02 |
| JP | 2006-183702 | 7/2006 | F16C 17/04 |
| JP | 2006-316677 | 11/2006 | F04C 18/02 |
| JP | 2007-162045 | 6/2007 | |
| JP | 2008-51018 | 3/2008 | F04C 18/02 |
| JP | 2008-51030 | 3/2008 | F04C 18/02 |
| JP | 2008-106940 | 5/2008 | F16J 15/34 |
| JP | 2011-74931 | 4/2011 | F16J 15/34 |
| JP | 2011-185292 | 9/2011 | F16J 15/34 |
| JP | 2012-2295 | 1/2012 | F16J 15/34 |
| JP | 2012-062534 | 3/2012 | |
| JP | 2012-82794 | 4/2012 | F04C 18/02 |
| JP | 2012-122135 | 6/2012 | C25D 15/02 |
| JP | 2013-167216 | 8/2013 | F04C 18/02 |
| JP | 2013-213545 | 10/2013 | F16C 32/06 |
| JP | 2014-529052 | 10/2014 | |
| JP | 2015-063647 | 4/2015 | |
| JP | 2015-68330 | 4/2015 | F04C 29/00 |
| JP | 5693599 | 4/2015 | |
| JP | 2015-183631 | 10/2015 | F04C 2/10 |
| JP | 2016-61208 | 4/2016 | F04C 18/02 |
| JP | 2016-80090 | 5/2016 | F16J 15/34 |
| JP | 5960145 | 7/2016 | F16J 15/34 |
| WO | WO2006051702 | 5/2006 | F16J 15/34 |
| WO | WO2011115073 | 9/2011 | F16J 15/34 |
| WO | WO2012046749 | 4/2012 | F16J 15/34 |
| WO | WO2013035503 | 3/2013 | F16J 15/34 |
| WO | WO2013053411 | 4/2013 | |
| WO | WO2014061544 | 4/2014 | |
| WO | WO2014148316 | 9/2014 | F16J 15/34 |
| WO | WO2014148317 | 9/2014 | F16J 15/34 |
| WO | WO2014174725 | 10/2014 | F16J 15/34 |
| WO | WO2015111707 | 7/2015 | F16J 15/18 |
| WO | WO2016035860 | 3/2016 | F16J 15/34 |
| WO | WO2016167262 | 10/2016 | F16J 15/34 |
| WO | WO2016186015 | 11/2016 | F16J 15/34 |
| WO | WO2016186019 | 11/2016 | F16J 15/34 |
| WO | WO2016186020 | 11/2016 | F16J 15/34 |
| WO | WO2016203878 | 12/2016 | F16J 15/34 |
| WO | WO2017002774 | 1/2017 | F16J 15/34 |
| WO | WO2017061406 | 4/2017 | F16J 15/34 |

(56) References Cited

FOREIGN PATENT DOCUMENTS

| WO | WO2018025629 | 2/2018 | ............ F02B 55/02 |
| WO | WO2018092742 | 5/2018 | ............ F16J 15/34 |
| WO | WO2018105505 | 6/2018 | ............ F16J 33/12 |
| WO | WO2018139231 | 8/2018 | ............ F16J 15/34 |
| WO | WO2020129846 | 6/2020 | ............ F16C 17/04 |
| WO | WO2021125201 | 6/2021 | ............ F16J 15/18 |

OTHER PUBLICATIONS

International Preliminary Report on Patentability issued in PCT/JP2021/024940, dated Jan. 10, 2023, 4 pages.
International Search Report and Written Opinion issued in PCT/JP2021/024941, dated Sep. 14, 2021, with English translation, 13 pages.
International Preliminary Report on Patentability issued in PCT/JP2021/024941, dated Jan. 10, 2023, 5 pages.
International Search Report and Written Opinion issued in PCT/JP2021/024938, dated Aug. 3, 2021, with English translation, 12 pages.
International Preliminary Report on Patentability issued in PCT/JP2021/024938, dated Jan. 10, 2023, 4 pages.
International Search Report and Written Opinion issued in PCT/JP2021/024945, dated Sep. 7, 2021, with English translation, 16 pages.
International Preliminary Report on Patentability issued in PCT/JP2021/024945, dated Jan. 10, 2023, 6 pages.
International Search Report and Written Opinion issued in PCT/JP2021/024943, dated Sep. 7, 2021, with English translation, 13 pages.
International Preliminary Report on Patentability issued in PCT/JP2021/024943, dated Jan. 10, 2023, 5 pages.
International Search Report and Written Opinion issued in PCT/JP2021/024944, dated Jul. 27, 2021, with English translation, 11 pages.
International Preliminary Report on Patentability issued in PCT/JP2021/024944, dated Jan. 10, 2023, 4 pages.
Official Action issued in related U.S. Appl. No. 18/012,853, dated Sep. 8, 2023, 11 pages.
Official Action issued in related U.S. Appl. No. 18/012,857, dated Oct. 5, 2023, 11 pages.
Notice of Allowance issued in related U.S. Appl. No. 18/013,515, dated Dec. 19, 2023, 10 pages.
Official Action issued in related U.S. Appl. No. 18/013,513, dated Feb. 15, 2024, 9 pages.
Official Action issued in related U.S. Appl. No. 18/012,857, dated Mar. 21, 2024, 13 pages.
Japanese Official Action issued in related application serial No. 2022-535275, dated Feb. 13, 2024, 8 pages.
U.S. Appl. No. 18/012,853, filed Dec. 23, 2022, Suzuki.
U.S. Appl. No. 18/012,857, filed Dec. 23, 2022, Suzuki.
U.S. Appl. No. 18/013,513, filed Dec. 28, 2022, Suzuki.
U.S. Appl. No. 18/013,515, filed Dec. 28, 2022, Suzuki.
U.S. Appl. No. 18/013,520, filed Dec. 28, 2022, Suzuki.
Chinese Official Action issued in related Chinese Patent Application Serial No. 202180044553.5, dated Apr. 28, 2024, 13 pages with translation.

\* cited by examiner

SLIDING COMPONENT

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a fluid leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance of a sliding surface entailing eccentric rotation.

Solution to Problem

In order to solve the above problem, a sliding component according to the present invention has an annular shape with high-pressure and low-pressure fluids facing inside and outside of the sliding component and has a sliding surface relatively sliding with eccentric rotation. The sliding surface is provided with a plurality of high-pressure grooves open to a space in which the high-pressure fluid exists and a plurality of low-pressure grooves open to a space in which the low-pressure fluid exists in. The high-pressure grooves and the low-pressure grooves are arranged in a circumferential direction. According to the aforesaid feature of the present invention, dynamic pressure is generated in any of the high-pressure groove and the low-pressure groove provided in the circumferential direction using the fluid in the spaces inside and outside the sliding component and in accordance with the direction of relative movement of the high-pressure groove and the low-pressure groove entailed by eccentric rotation, the sliding surfaces are slightly separated from each other, and a fluid film is formed. As a result, the lubricity during sliding is improved and the frictional resistance of the sliding surface can be stably reduced.

It may be preferable that in a plan view parallel to the sliding surface, an area of the low-pressure groove is larger than an area of the high-pressure groove. According to this preferable configuration, the dynamic pressure generated in the low-pressure groove and the dynamic pressure generated in the high-pressure groove are easily balanced in accordance with the direction of relative movement of the high-pressure groove and the low-pressure groove entailed by eccentric rotation. Accordingly, the vibration, tilt, or the like of the sliding component attributable to dynamic pressure generation is suppressed.

It may be preferable that the high-pressure grooves and the low-pressure grooves are disposed alternately inside and outside of the sliding surface. According to this preferable configuration, dynamic pressure is generated in either the high-pressure groove or the low-pressure groove disposed alternately inside and outside regardless of the direction of relative movement of the high-pressure groove and the low-pressure groove entailed by eccentric rotation. Accordingly, the dynamic pressure generated over the circumferential direction of the sliding surface is well-balanced.

It may be preferable that the high-pressure grooves and the low-pressure grooves each are equiangularly arranged in the circumferential direction. According to this preferable configuration, the sliding surfaces can be separated from each other substantially evenly in the circumferential direction by the dynamic pressure generated in the high-pressure groove and the low-pressure groove.

It may be preferable that each of the high-pressure grooves and each of the low-pressure grooves have a shape formed from a part of a circle. According to this preferable configuration, stable dynamic pressure can be generated along the circular arc-shaped wall surfaces of the high-pressure groove and the low-pressure groove in accordance with the direction of relative movement of the high-pressure groove and the low-pressure groove entailed by eccentric rotation.

It may be preferable that the space in which the low-pressure fluid exists in is a space on an outer diameter side of the sliding surface. According to this preferable configuration, the low-pressure groove is formed on the outer diameter side of the sliding surface, and thus it is easy to ensure a large opening and a large area in the direction parallel to the sliding surface in the low-pressure groove.

DESCRIPTION OF EMBODIMENTS

Figure 1:
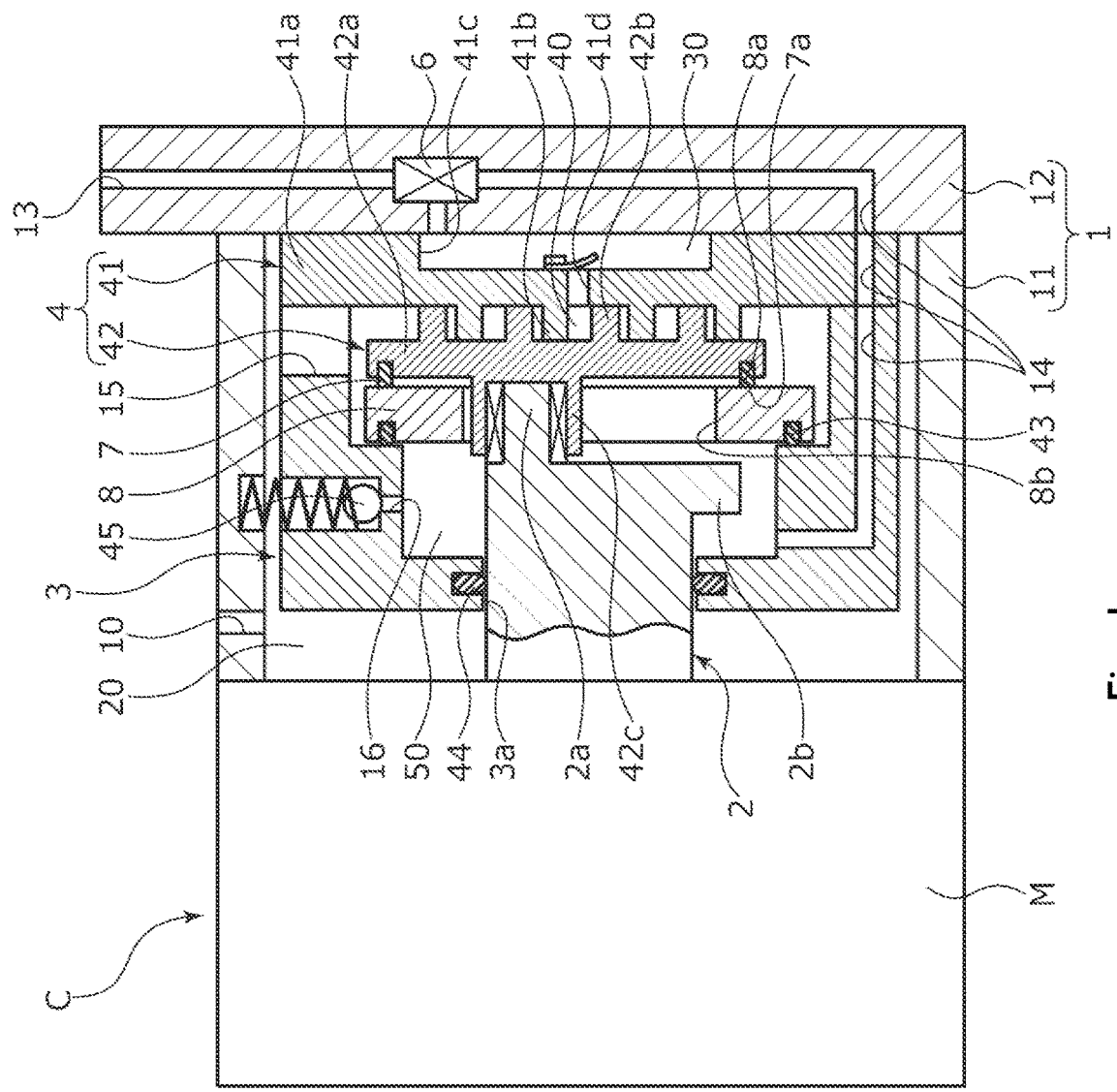
FIG. 1 is a schematic configuration diagram illustrating a scroll compressor to which a side seal as a sliding component according to a first embodiment of the present invention is applied.

Modes for implementing the sliding component according to the present invention will be described below based on embodiments.

First Embodiment

The sliding component according to a first embodiment of the present invention will be described with reference to FIGS. 1 to 8. In the drawings, the groove formed in the sliding surface of the sliding component or the like is dotted for convenience of description.

The sliding component according to the first embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50. It should be noted that the back pressure chamber 50 is formed in the cylindrical inner casing 3 accommodated in the casing 11.

A discharge communication passage 13 is formed in the cover 12. The discharge communication passage 13 allows the refrigerant circuit (not illustrated) and the high-pressure chamber 30 to communicate with each other. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one end of the inner casing 3 abutting against an end plate 41*a* of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a substantially sealed shape. The movable scroll 42 is accommodated in the inner casing 3.

The fixed scroll 41 is made of metal and includes a spiral lap 41*b*. The spiral lap 41*b* projects from the surface of the disk-shaped end plate 41*a*, that is, one end surface of the end plate 41*a*. In addition, a recessed portion 41*c* recessed on the inner diameter side of the back surface of the end plate 41*a*, that is, the other end surface of the end plate 41*a* is formed in the fixed scroll 41. The high-pressure chamber 30 is defined from the recessed portion 41*c* and the end surface of the cover 12.

The movable scroll 42 is made of metal and includes a spiral lap 42*b*. The spiral lap 42*b* projects from the surface of a disk-shaped end plate 42*a*, that is, one end surface of the end plate 42*a*. In addition, a boss 42*c* protruding from the middle of the back surface of the end plate 42*a*, that is, the other end surface of the end plate 42*a* is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
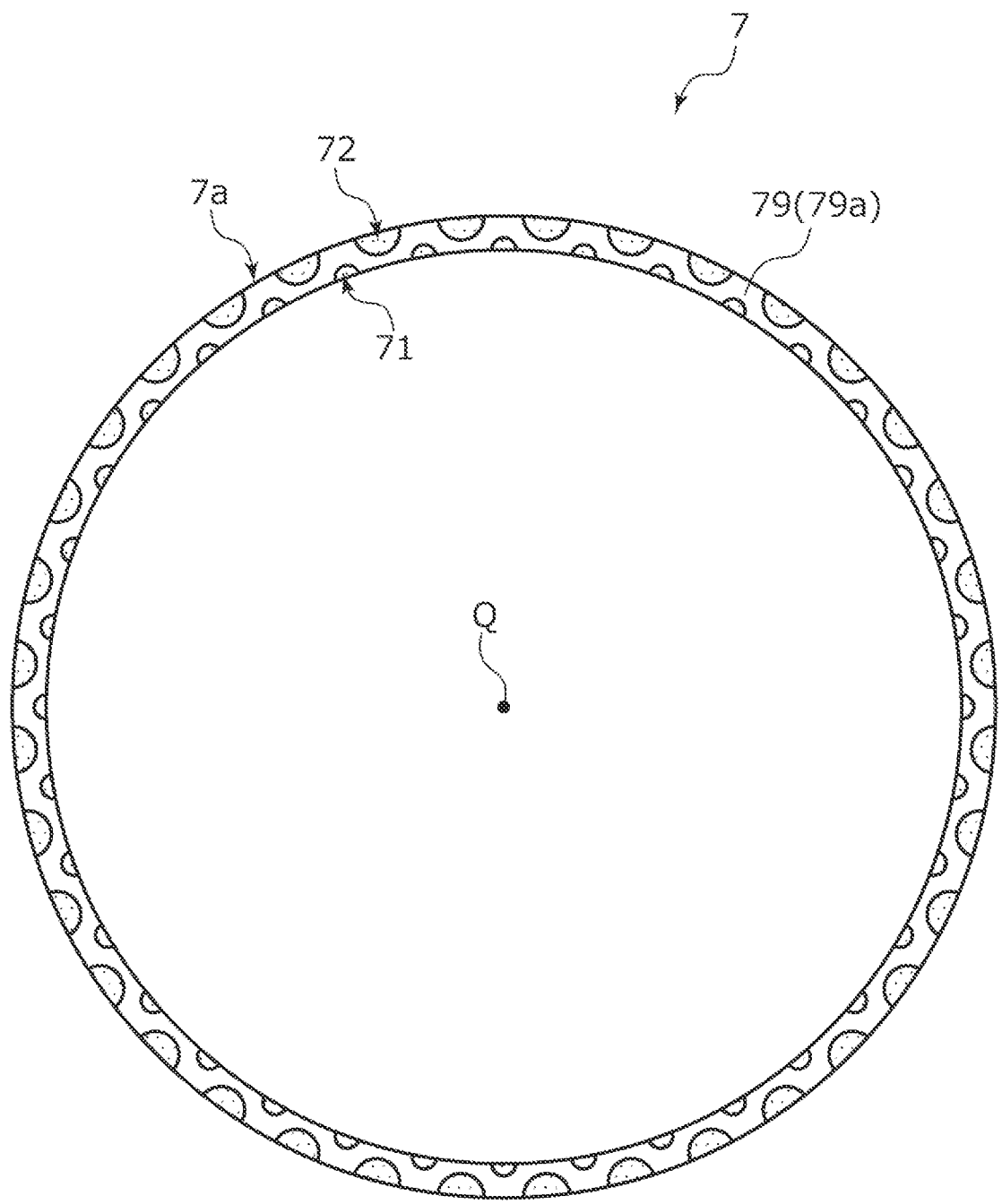
FIG. 2 is a diagram illustrating a sliding surface of the side seal in the first embodiment of the present invention.
Figure 3:
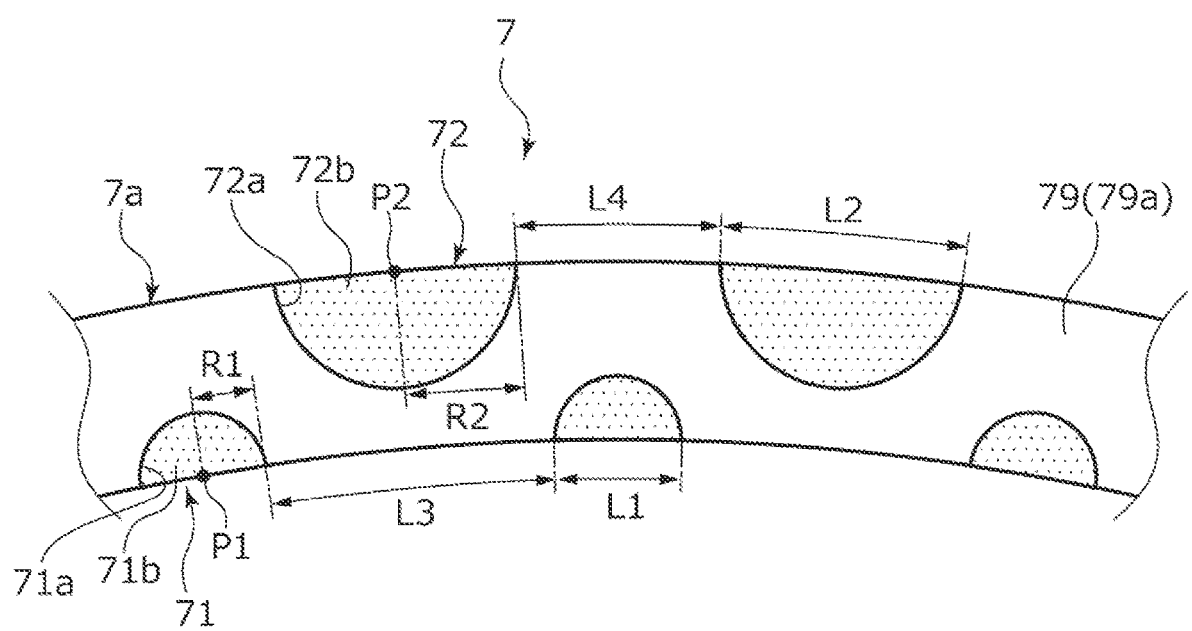
FIG. 3 is a partially enlarged view illustrating high-pressure and low-pressure grooves in the sliding surface in the first embodiment of the present invention.

Next, the side seal 7 as a sliding component in the present embodiment will be described. As illustrated in FIGS. 2 and 3, the side seal 7 is made of resin and has a rectangular cross section and an annular shape in an axial view. In addition, the side seal 7 is fixed to the back surface of the end plate 42a of the movable scroll 42 (see FIG. 1). It should be noted that a sliding surface 7a of the side seal 7 is illustrated in FIGS. 2 and 3.

The sliding surface 7a abutting against a sliding surface 8a of the thrust plate 8 is formed on one side surface of the side seal 7.

As illustrated in FIG. 2, the sliding surface 7a of the side seal 7 includes a land 79, a plurality of high-pressure grooves 71, and a plurality of low-pressure grooves 72. The high-pressure groove 71 is recessed from a flat surface 79a of the land 79 and is formed so as to be open to the back pressure chamber 50 (see FIG. 1), which is a space a high-pressure fluid is in, on the inner diameter side thereof. The low-pressure groove 72 is recessed from the flat surface 79a of the land 79 and is formed so as to be open to the low-pressure chamber 20 (see FIG. 1), which is a space a low-pressure fluid is in, on the outer diameter side of the sliding surface 7a. The high-pressure groove 71 and the low-pressure groove 72 are arranged alternately inside and outside and substantially equally in the circumferential direction of the sliding surface 7a.

As illustrated in FIG. 3, the high-pressure groove 71 is formed in a substantially semicircular shape having a center P1 at the innermost diameter of the sliding surface 7a. In addition, the low-pressure groove 72 is formed in a substantially semicircular shape having a center P2 at the outermost diameter of the sliding surface 7a. In other words, the high-pressure groove 71 and the low-pressure groove 72 are formed from a part of the direction parallel to the sliding surface 7a, that is, a circle in an axial view.

Specifically, the high-pressure groove 71 is formed from a wall surface 71a and a bottom surface 71b. The wall surface 71a extends substantially orthogonal to the surface 79a of the land 79, has a constant radius of curvature, and is continuously formed in a substantially semicircular arc shape. The bottom surface 71b extends substantially orthogonal to the end portion of the wall surface 71a and substantially parallel to the surface 79a of the land 79 and is formed in a planar shape. It should be noted that the high-pressure grooves 71 have the same size but may be different in size.

The low-pressure groove 72 is formed from a wall surface 72a and a bottom surface 72b. The wall surface 72a extends substantially orthogonal to the surface 79a of the land 79, has a constant radius of curvature, and is continuously formed in a substantially semicircular arc shape. The bottom surface 72b extends substantially orthogonal to the end portion of the wall surface 72a and substantially parallel to the surface 79a of the land 79 and is formed in a planar shape. It should be noted that the low-pressure grooves 72 have the same size but may be different in size.

It should be noted that the bottom surface 71b of the high-pressure groove 71 and the bottom surface 72b of the low-pressure groove 72 are not limited to those formed in a planar shape extending substantially parallel to the sliding surface 7a and may be formed as, for example, inclined surfaces or curved surfaces.

In addition, the depth dimension of the high-pressure groove 71, which is the dimension from the surface 79a of the land 79 to the bottom surface 71b of the high-pressure groove 71, and the depth dimension of the low-pressure groove 72, which is the dimension from the surface 79a of the land 79 to the bottom surface 72b of the low-pressure groove 72, are substantially the same and a depth at which dynamic pressure can be generated to separate the sliding surfaces 7a and 8a from each other with sliding relative to the sliding surface 8a of the thrust plate 8. It should be noted that the depth dimensions of the high-pressure groove 71 and the low-pressure groove 72 are not limited to those substantially the same.

In addition, the low-pressure groove 72 is formed larger than the high-pressure groove 71 in area in the direction parallel to the sliding surface 7a (that is, axial-view area). Specifically, a radius R2 of the low-pressure groove 72, which is the dimension from the center P2 to the wall surface 72a in the low-pressure groove 72, is longer than a radius R1 of the high-pressure groove 71, which is the dimension from the center P1 to the wall surface 71a in the high-pressure groove 71 (i.e., R1<R2).

In addition, a circumferential dimension L2 of the low-pressure groove 72 is longer than a circumferential dimension L4 of the land part between the adjacent low-pressure grooves 72 (L2>L4). In other words, the plurality of low-pressure grooves 72 are densely formed over the circumferential direction of the sliding surface 7a and the opening area of the low-pressure groove 72 into which the fluid flows from the space on the outer diameter side of the sliding surface 7a is large.

In addition, the wall surface 72a of the low-pressure groove 72 extends to a position on the inner diameter side as compared with the middle of the sliding surface 7a in the radial direction. As a result, the low-pressure groove 72 has a large fluid holding capacity.

In addition, the circumferential dimension L2 of the low-pressure groove 72 is shorter than a circumferential dimension L3 of the land part between the adjacent high-pressure grooves 71 (i.e., L2<L3) and a circumferential dimension L1 of the high-pressure groove 71 is shorter than the circumferential dimension L4 of the land part between the adjacent low-pressure grooves 72 (i.e., L1<L4).

Referring to FIG. 1, the thrust plate 8 is made of metal and has an annular shape. A seal ring 43 is fixed to one end surface of the thrust plate 8. In addition, the seal ring 43 abuts against the inside surface of the inner casing 3. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed section formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the back pressure communication passage 14 allowing the high-pressure chamber 30 and the back pressure chamber 50 to communicate with each other is formed over the cover 12, the fixed scroll 41, and the inner casing 3. In addition, the back pressure communication passage 14 is provided with an orifice (not illustrated) and, after depressurization adjustment by means of the orifice, the refrigerant in the high-pressure chamber 30 is supplied to the back pressure chamber 50 together with the lubricating oil separated by the oil separator 6. As a result, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other. In addition, a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 4).

Figure 4A:
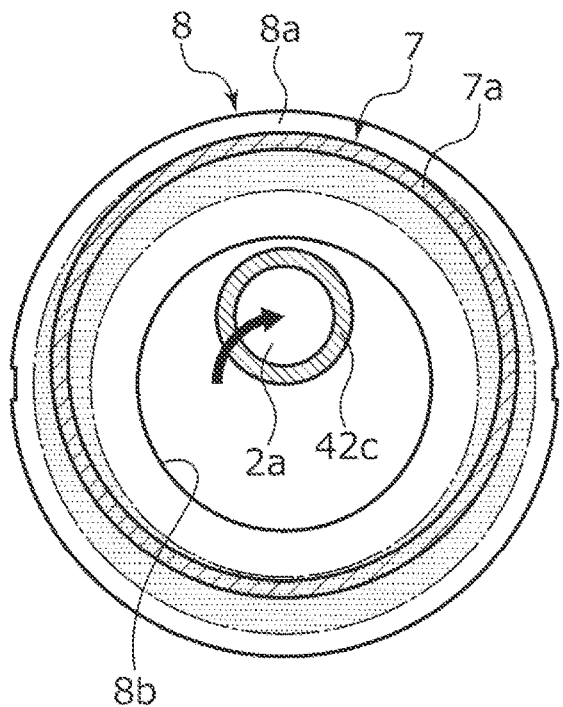
FIG. 4 is a diagram illustrating relative sliding between the sliding surface of the side seal and a sliding surface of a thrust plate in the first embodiment of the present invention. It should be noted that FIG. 4A illustrates the start position of the relative sliding
FIGS. 4B to 4D illustrate the positional relationships between the relatively sliding surfaces of the side seal and the thrust plate at an eccentric rotary shaft rotation of 90, 180, and 270 degrees, respectively.
Figure 4B:
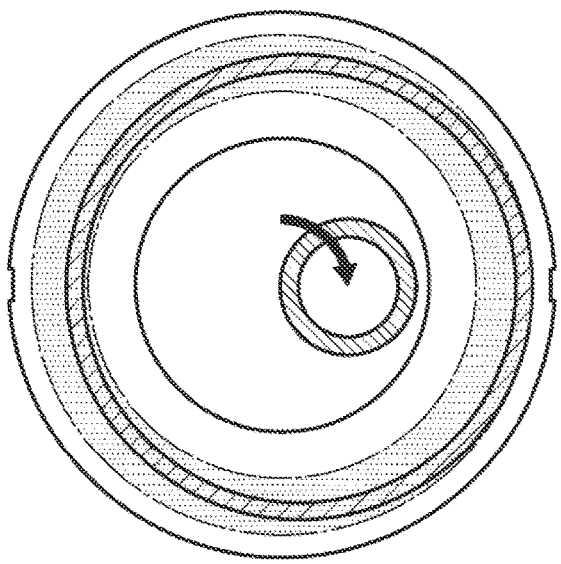
Figure 4C:
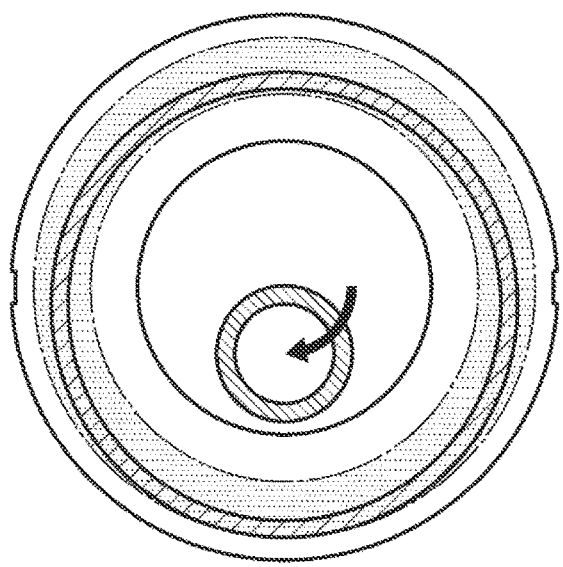
Figure 4D:
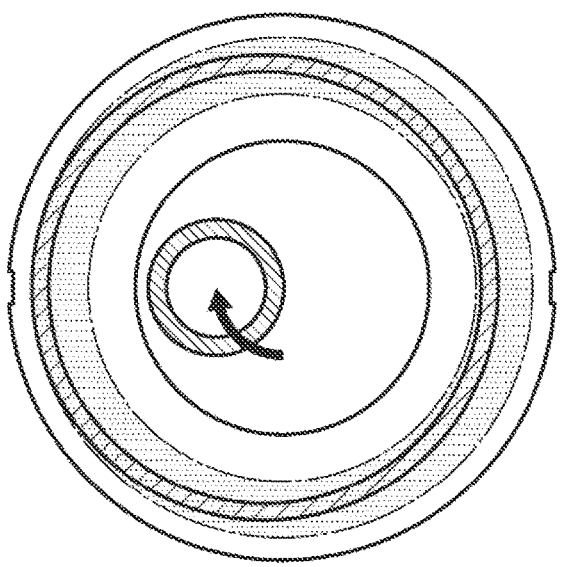

It should be noted that FIGS. 4A to 4D in FIG. 4 illustrate the rotational trajectory of the boss 42c that is viewed from the fixed scroll 41 side (see FIG. 1). Respectively illustrated in FIGS. 4B to 4D are the boss 42c rotated by 90 degrees, 180 degrees, and 270 degrees with FIG. 4A indicated by a black arrow serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Next, dynamic pressure generation during the sliding of the side seal 7 relative to the thrust plate 8 will be described with reference to FIGS. 5 to 8. It should be noted that a fluid containing, for example, a refrigerant and lubricating oil flows into the high-pressure groove 71 and the low-pressure groove 72 even when the rotation is stopped. In addition, the side seal 7 that is viewed from the drive motor M side (see FIG. 1) is illustrated in each of FIGS. 5 to 8 and the circle marks on the wall surface 71a of the high-pressure groove 71 and the wall surface 72a of the low-pressure groove 72 indicate the points where the pressure is highest in the high-pressure groove 71 and the low-pressure groove 72, respectively.

Although not illustrated for convenience of description, when the side seal 7 slides relative to the thrust plate 8 (see FIG. 1), in a case where the side seal 7 moves, the fluid in the high-pressure groove 71 and the low-pressure groove 72 receives a shear force in a direction substantially opposite to the direction in which the side seal 7 moves and moves in that direction.

As a result, the pressure of the fluid increases on the wall surface 71a of the high-pressure groove 71 and the wall surface 72a of the low-pressure groove 72, and a positive dynamic pressure is generated. It should be noted that in the following description, positive dynamic pressure may be simply described as dynamic pressure.

As a result of the dynamic pressure generation, the sliding surfaces 7a and 8a are slightly separated from each other and a fluid film is formed by the fluid flowing in between the sliding surfaces 7a and 8a. As a result, the lubricity between the sliding surfaces 7a and 8a is improved, and thus the frictional resistance between the sliding surfaces 7a and 8a decreases.

Figure 5:
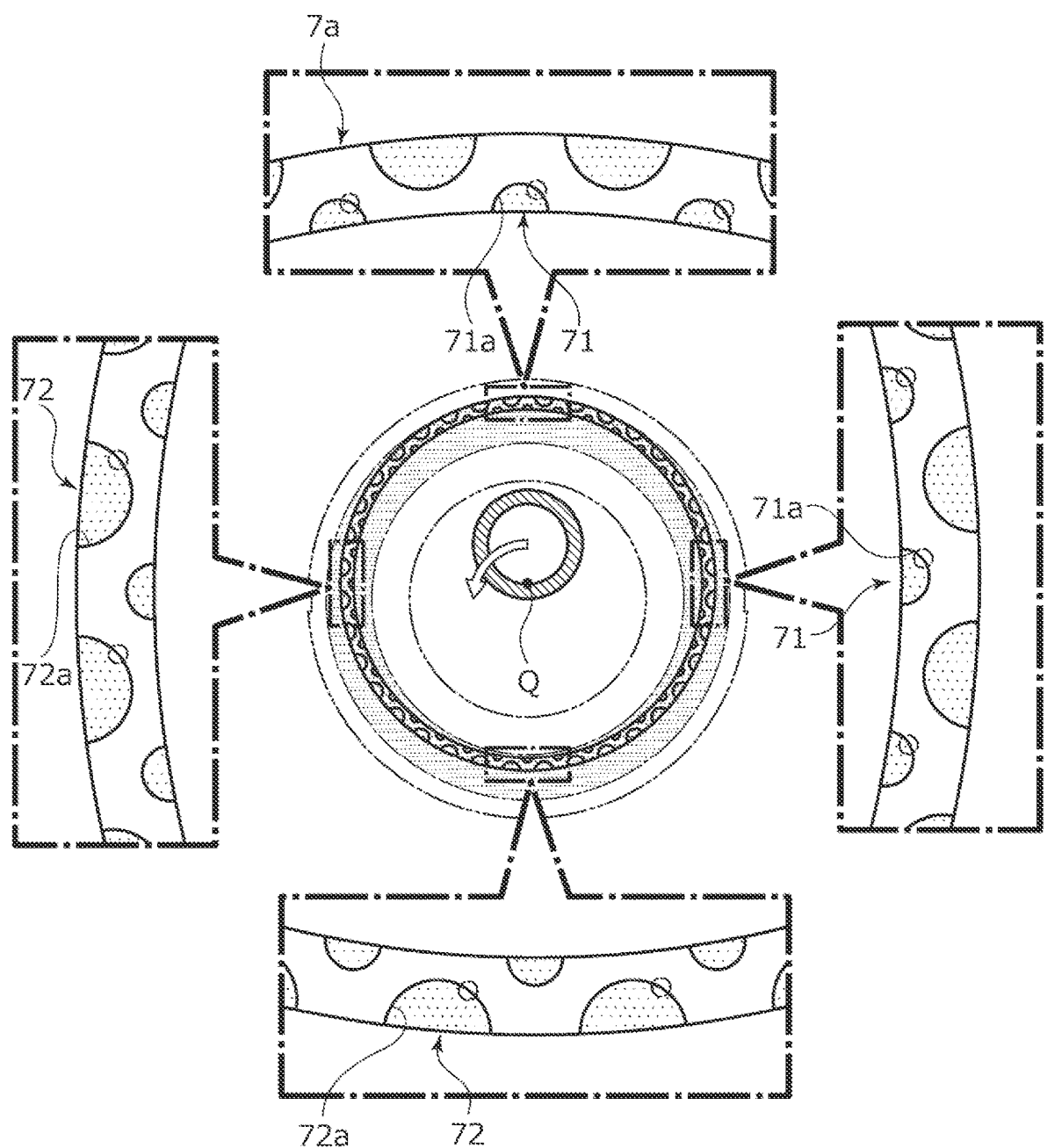
FIG. 5 is a diagram illustrating the distribution of the pressure generated in a plurality of grooves as a result of the relative movement of the groove entailed by the eccentric rotary shaft rotation in the sliding surface of the side seal illustrated in FIG. 4A.

Next, dynamic pressure generation over the entire side seal 7 will be described. Referring to FIG. 5, when the side seal 7 is to move from the rotational state of FIG. 4A to the rotational state of FIG. 4B as indicated by the white arrow, the fluid moves relative to the white arrow in the opposite direction. In each high-pressure groove 71, the fluid in the high-pressure groove 71 moves toward the region on the upper right side of the wall surface 71a and dynamic pressure is generated. In addition, in each low-pressure groove 72, the fluid in the low-pressure groove 72 moves toward the region on the upper right side of the wall surface 72a and dynamic pressure is generated. In other words, dynamic pressure is generated in each high-pressure groove 71 formed in a range of approximately 180 degrees on the inner diameter side of the sliding surface 7a from the right side of the page to the upper side of the page and dynamic pressure is generated in each low-pressure groove 72 formed in a range of approximately 180 degrees on the outer diameter side of the sliding surface 7a from the left side of the page to the lower side of the page.

Figure 6:
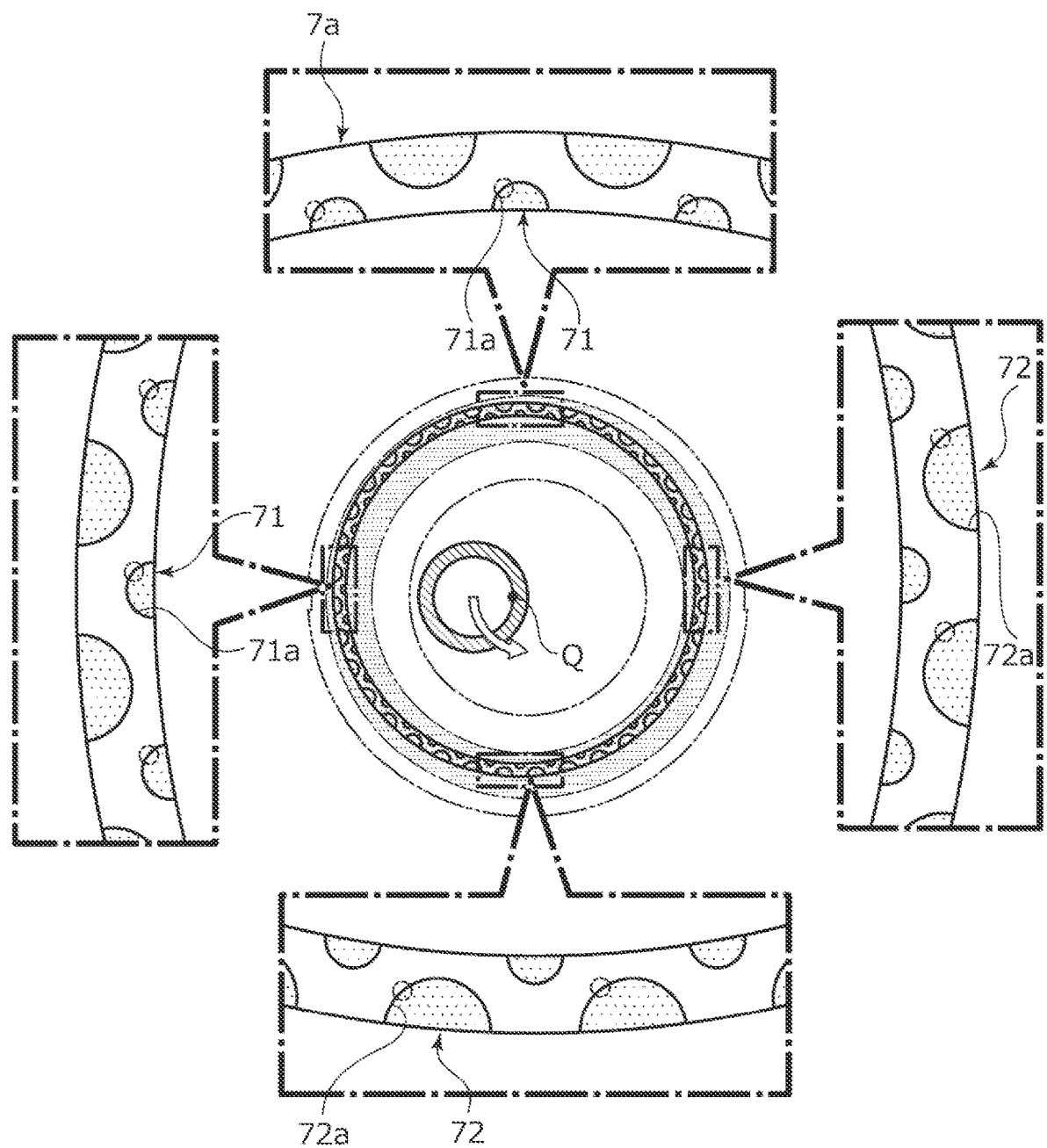
FIG. 6 is a diagram illustrating the distribution of the pressure generated in the plurality of grooves as a result of the relative movement of the groove entailed by the eccentric rotary shaft rotation in the sliding surface of the side seal illustrated in FIG. 4B.

In addition, referring to FIG. 6, when the side seal 7 is to move from the rotational state of FIG. 4B to the rotational state of FIG. 4C as indicated by the white arrow, the fluid moves relative to the white arrow in the opposite direction. In each high-pressure groove 71, the fluid in the high-pressure groove 71 moves toward the region on the upper left side of the wall surface 71a and dynamic pressure is generated. In addition, in each low-pressure groove 72, the fluid in the low-pressure groove 72 moves toward the region on the upper left side of the wall surface 72a and dynamic pressure is generated. In other words, dynamic pressure is generated in each high-pressure groove 71 formed in a range of approximately 180 degrees on the inner diameter side of the sliding surface 7a from the upper side of the page to the left side of the page and dynamic pressure is generated in each low-pressure groove 72 formed in a range of approximately 180 degrees on the outer diameter side of the sliding surface 7a from the lower side of the page to the right side of the page.

Figure 7:
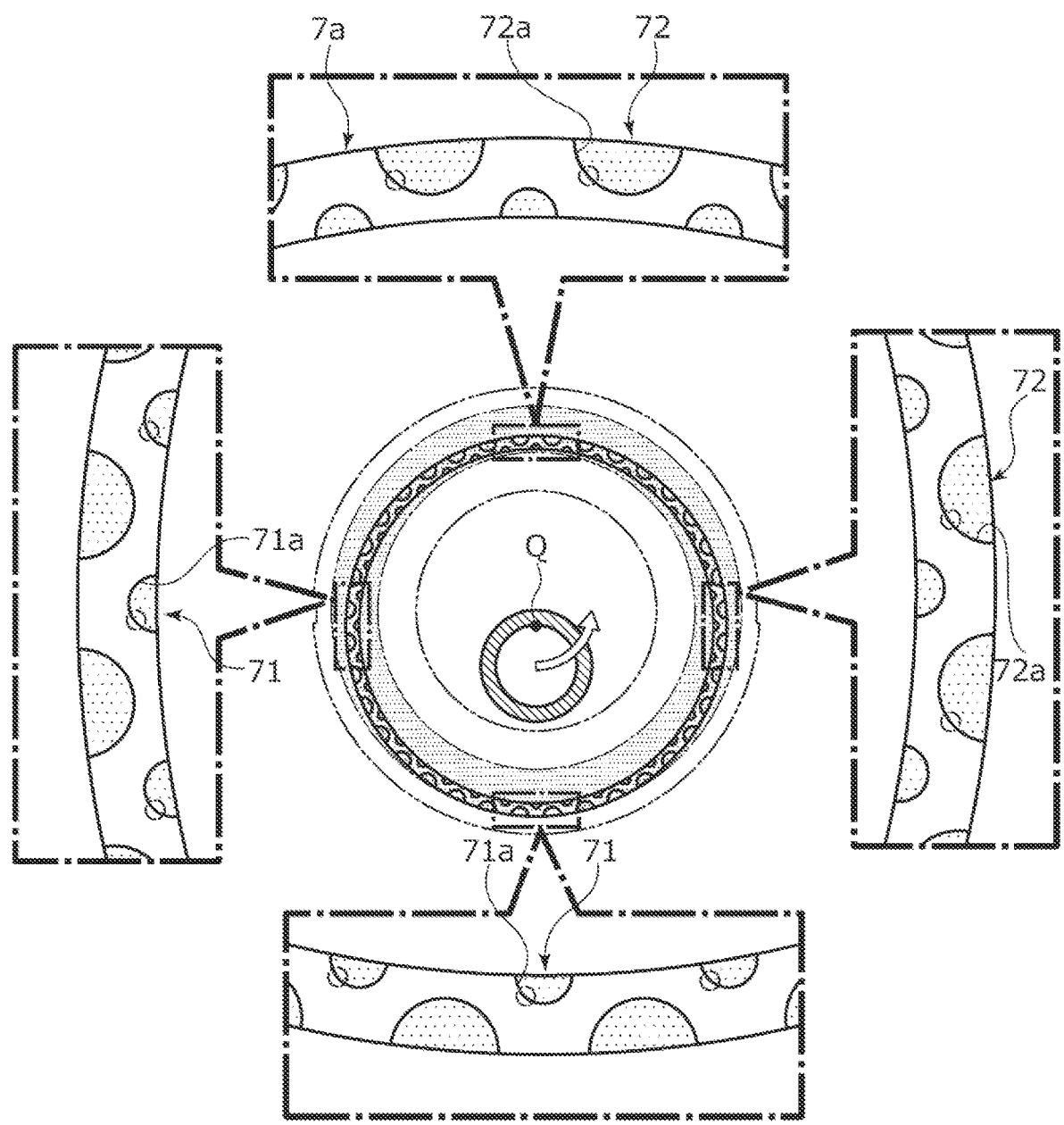
FIG. 7 is a diagram illustrating the distribution of the pressure generated in the plurality of grooves as a result of the relative movement of the groove entailed by the eccentric rotary shaft rotation in the sliding surface of the side seal illustrated in FIG. 4C.

In addition, referring to FIG. 7, when the side seal 7 is to move from the rotational state of FIG. 4C to the rotational state of FIG. 4D as indicated by the white arrow, the fluid moves relative to the white arrow in the opposite direction.

In each high-pressure groove 71, the fluid in the high-pressure groove 71 moves toward the region on the lower left side of the wall surface 71a and dynamic pressure is generated. In addition, in each low-pressure groove 72, the fluid in the low-pressure groove 72 moves toward the region on the lower left side of the wall surface 72a and dynamic pressure is generated. In other words, dynamic pressure is generated in each high-pressure groove 71 formed in a range of approximately 180 degrees on the inner diameter side of the sliding surface 7a from the left side of the page to the lower side of the page and dynamic pressure is generated in each low-pressure groove 72 formed in a range of approximately 180 degrees on the outer diameter side of the sliding surface 7a from the right side of the page to the upper side of the page.

Figure 8:
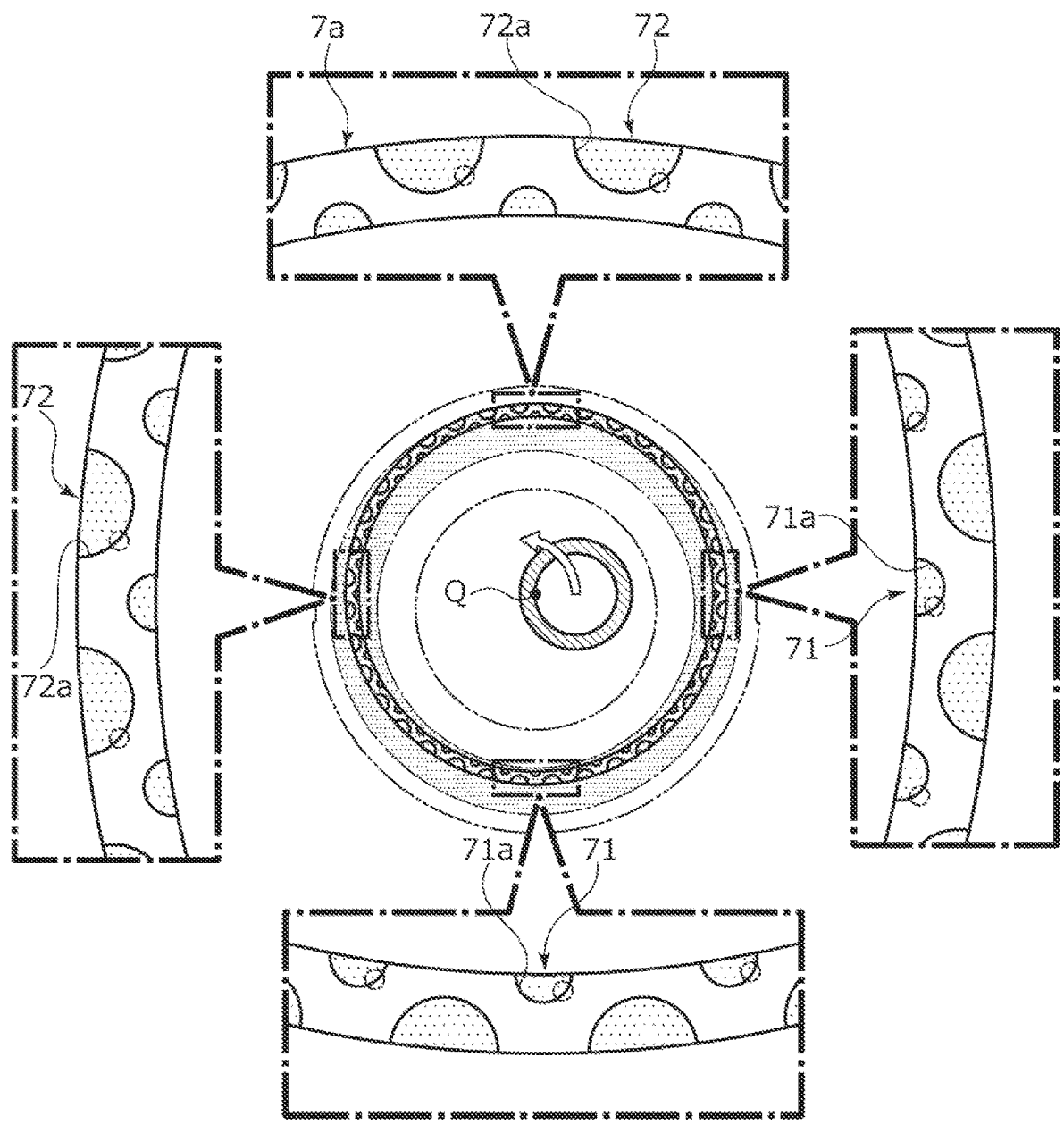
FIG. 8 is a diagram illustrating the distribution of the pressure generated in the plurality of grooves as a result of the relative movement of the groove entailed by the eccentric rotary shaft rotation in the sliding surface of the side seal illustrated in FIG. 4D.

In addition, referring to FIG. 8, when the side seal 7 is to move from the rotational state of FIG. 4D to the rotational state of FIG. 4A as indicated by the white arrow, the fluid moves relative to the white arrow in the opposite direction. In each high-pressure groove 71, the fluid in the high-pressure groove 71 moves toward the region on the lower right side of the wall surface 71a and dynamic pressure is generated. In addition, in each low-pressure groove 72, the fluid in the low-pressure groove 72 moves toward the region on the lower right side of the wall surface 72a and dynamic pressure is generated. In other words, dynamic pressure is generated in each high-pressure groove 71 formed in a range of approximately 180 degrees on the inner diameter side of the sliding surface 7a from the lower side of the page to the right side of the page and dynamic pressure is generated in each low-pressure groove 72 formed in a range of approximately 180 degrees on the outer diameter side of the sliding surface 7a from the upper side of the page to the left side of the page.

In addition, the radial width of the side seal 7 where the high-pressure groove 71 and the low-pressure groove 72 are formed in the sliding surface 7a is smaller than the radial width of the relatively sliding thrust plate 8 (see FIGS. 1 and 4). According to this, between the sliding surfaces 7a and 8a sliding relative to each other with the eccentric rotation, the entire sliding surface 7a of the side seal 7 is always positioned in the sliding region between the sliding surface 7a of the side seal 7 and the sliding surface 8a of the thrust plate 8 (See FIG. 4). As a result, dynamic pressure can be reliably generated by the high-pressure groove 71 and the low-pressure groove 72.

In addition, as for the high-pressure groove 71 and the low-pressure groove 72, the wall surfaces 71a and 72a are formed in a substantially semicircular arc shape in an axial view. Accordingly, in each high-pressure groove 71 and each low-pressure groove 72, the points of the pressure generated on the wall surfaces 71a and 72a gradually move in a range of approximately 180 degrees along the wall surfaces 71a and 72a in accordance with the rotation angle of the boss 42c (see FIGS. 5 to 8).

In addition, as for the high-pressure groove 71 and the low-pressure groove 72, the wall surfaces 71a and 72a having a substantially semicircular arc shape are continuous with the same radius of curvature, and thus the pressure generated in each high-pressure groove 71 and low-pressure groove 72 is substantially the same regardless of the eccentric rotation angle. As a result, the dynamic pressure generated in each high-pressure groove 71 and low-pressure groove 72 between the sliding surfaces 7a and 8a is unlikely to change sharply, and the generated dynamic pressure is stable.

In addition, in the present embodiment, the low-pressure groove 72 is formed larger in axial-view area than the high-pressure groove 71, and the pressure generated in the high-pressure groove 71 and the pressure generated in the low-pressure groove 72 are balanced so as to be substantially the same.

In addition, the high-pressure groove 71 and the low-pressure groove 72 are arranged alternately inside and outside and substantially equally in the circumferential direction of the sliding surface 7a. Accordingly, in accordance with the direction of relative movement of the high-pressure groove 71 and the low-pressure groove 72 entailed by eccentric rotation, dynamic pressure is generated in each high-pressure groove 71 formed in a range of approximately 180 degrees on the inner diameter side of the sliding surface 7a and dynamic pressure is generated in each low-pressure groove 72 formed in a range of approximately 180 degrees half a lap off the range in the circumferential direction on the outer diameter side of the sliding surface 7a (see FIGS. 5 to 8). In other words, between the sliding surfaces 7a and 8a, substantially the same dynamic pressure is generated over the circumferential direction by each high-pressure groove 71 and each low-pressure groove 72.

As described above, in the side seal 7, dynamic pressure is generated in any of the high-pressure groove 71 and the low-pressure groove 72 provided in the circumferential direction using the fluid in the spaces inside and outside the side seal 7 and in accordance with the direction of relative movement of the high-pressure groove 71 and the low-pressure groove 72 entailed by eccentric rotation. Accordingly, the lubricity between the sliding surfaces 7a and 8a can be improved by forming a fluid film by slightly separating the sliding surfaces 7a and 8a from each other, and thus the frictional resistance of the sliding surfaces 7a and 8a can be stably reduced.

In addition, the low-pressure groove 72 is formed larger in axial-view area than the high-pressure groove 71, and thus the dynamic pressure generated in the low-pressure groove 72 and the dynamic pressure generated in the high-pressure groove 71 can be balanced so as to be substantially the same in accordance with the direction of relative movement of the sliding surface 7a entailed by eccentric rotation. Accordingly, the sliding surfaces 7a and 8a can be separated from each other substantially evenly in the circumferential direction, and the vibration, tilt, or the like of the side seal 7 attributable to dynamic pressure generation can be suppressed.

In addition, the high-pressure groove 71 and the low-pressure groove 72 are disposed alternately inside and outside in the sliding surface 7a, and thus dynamic pressure is generated in either the high-pressure groove 71 or the low-pressure groove 72 regardless of the direction of relative movement of the high-pressure groove 71 and the low-pressure groove 72 entailed by eccentric rotation. Accordingly, the dynamic pressure generated over the circumferential direction of the sliding surface 7a is well-balanced. In addition, the regions of formation of the high-pressure groove 71 and the low-pressure groove 72 in the sliding surface 7a are unlikely to interfere with each other, and thus the high-pressure groove 71 and the low-pressure groove 72 can be effectively formed with respect to the sliding surface 7a.

In addition, the low-pressure groove 72 is open to the low-pressure chamber 20, the low-pressure chamber 20 is a space a low-pressure fluid is in, the low-pressure chamber 20 is a space on the outer diameter side of the sliding surface 7a, and the low-pressure groove 72 is formed on the outer diameter side of the sliding surface 7a. Accordingly, it is easy to ensure a large opening and a large axial-view area in the low-pressure groove 72.0

Second Embodiment

Next, a high-pressure groove 171 and a low-pressure groove 172 of a side seal 107 as a sliding component according to a second embodiment of the present invention will be described with reference to FIG. 9. It should be noted that the description of configurations identical to those of the first embodiment will be omitted for redundancy avoidance.

Figure 9:
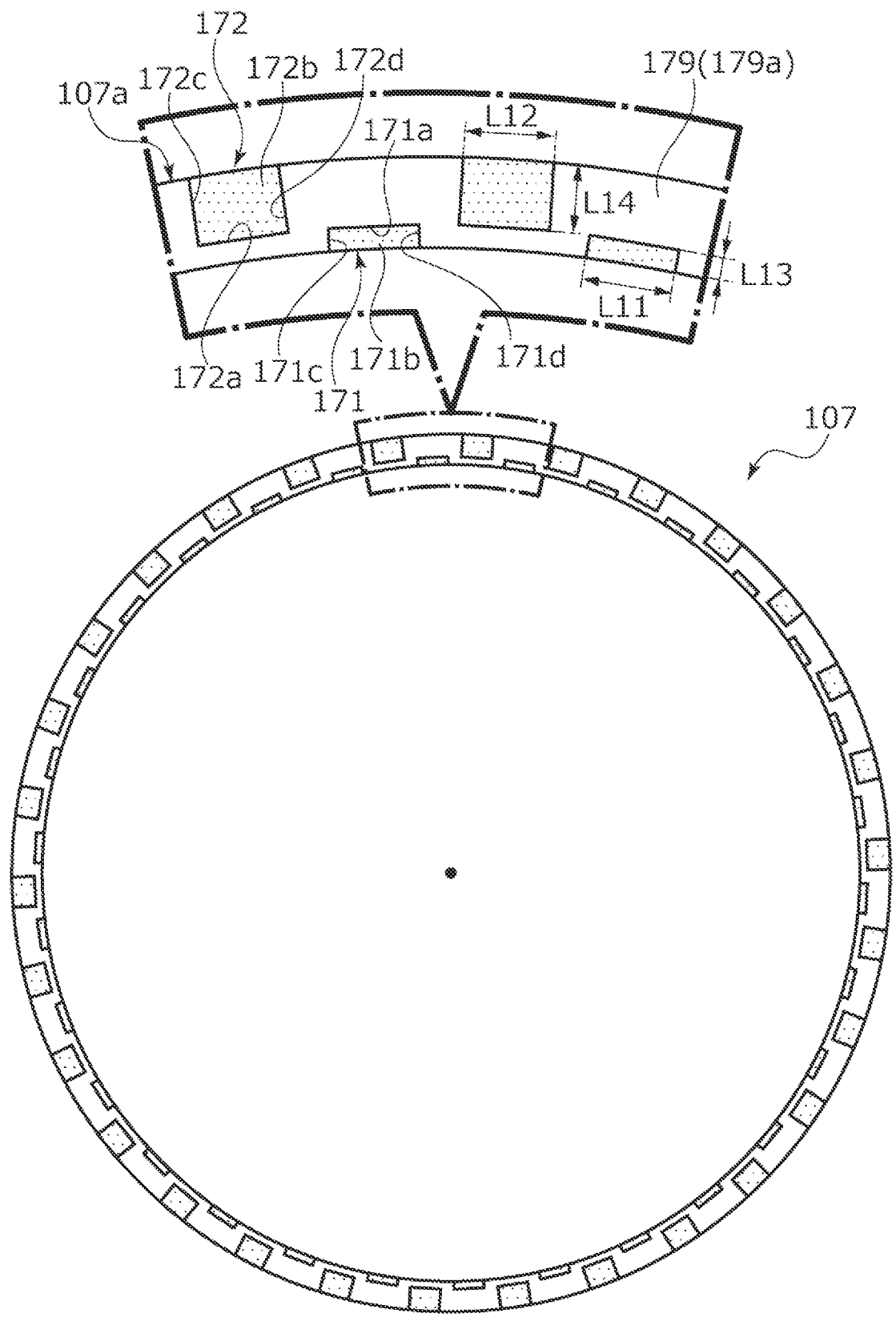
FIG. 9 is a diagram illustrating a sliding surface of a side seal as a sliding component according to a second embodiment of the present invention.

As illustrated in FIG. 9, the high-pressure groove 171 and the low-pressure groove 172 are formed in a substantially rectangular shape.

Specifically, the high-pressure groove 171 is formed from a wall surface 171a, side wall surfaces 171c and 171d, and a bottom surface 171b. The wall surface 171a extends substantially orthogonal to a surface 179a of a land 179 and extends linearly in the circumferential direction. The side wall surfaces 171c and 171d extend substantially orthogonal to the surface 179a of the land 179 and extend linearly in the radial direction. The bottom surface 171b extends substantially orthogonal to the end portions of the wall surface 171a and the side wall surfaces 171c and 171d and substantially parallel to the surface 179a of the land 179 and is formed in a planar shape.

The low-pressure groove 172 is formed from a wall surface 172a, side wall surfaces 172c and 172d, and a bottom surface 172b. The wall surface 172a extends substantially orthogonal to the surface 179a of the land 179 and extends linearly in the circumferential direction. The side wall surfaces 172c and 172d extend substantially orthogonal to the surface 179a of the land 179 and extend linearly in the radial direction. The bottom surface 172b extends substantially orthogonal to the end portions of the wall surface 172a and the side wall surfaces 172c and 172d and substantially parallel to the surface 179a of the land 179 and is formed in a planar shape.

In addition, a circumferential dimension L12 of the low-pressure groove 172 is substantially the same as a circumferential dimension L11 of the high-pressure groove 171 (i.e., L11=L12). As a result, the opening areas of the high-pressure groove 171 and the low-pressure groove 172 into which a fluid flows from the spaces inside and outside a sliding surface 107a are large.

In addition, a radial dimension L14 of the low-pressure groove 172 is longer than a radial dimension L13 of the high-pressure groove 171 (i.e., L13<L14). In other words, the low-pressure groove 172 is formed larger in axial-view area than the high-pressure groove 171.

In addition, the low-pressure groove 172 extends to a position on the inner diameter side as compared with the middle of the sliding surface 107a in the radial direction. As a result, the low-pressure groove 172 has a large fluid holding capacity.

As a result, in accordance with the direction of relative movement of the high-pressure groove 171 and the low-pressure groove 172 entailed by eccentric rotation, the fluid in the high-pressure groove 171 and the low-pressure groove 172 is concentrated in the corner portion formed by one of the side wall surfaces 171c and 171d and the wall surface 171a constituting the high-pressure groove 171 and the corner portion formed by one of the side wall surfaces 172c and 172d and the wall surface 172a constituting the low-pressure groove 172. Accordingly, high dynamic pressure is generated in the high-pressure groove 171 and the low-pressure groove 172.

Third Embodiment

Next, a high-pressure groove 271 and a low-pressure groove 272 of a side seal 207 as a sliding component according to a third embodiment of the present invention will be described with reference to FIG. 10. It should be noted that the description of configurations identical to those of the first embodiment will be omitted for redundancy avoidance.

Figure 10:
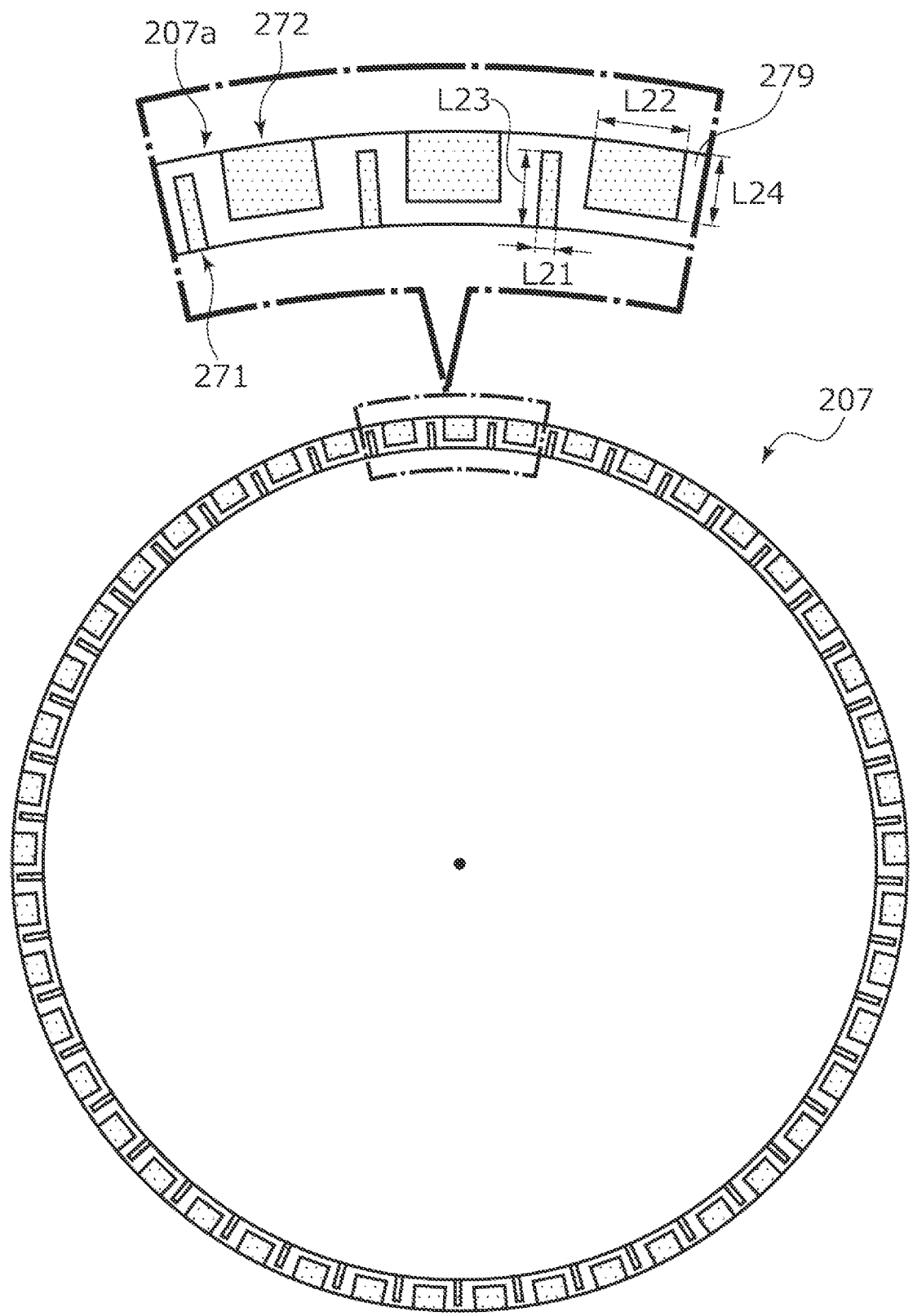
FIG. 10 is a diagram illustrating a sliding surface of a side seal as a sliding component according to a third embodiment of the present invention.

As illustrated in FIG. 10, the high-pressure groove 271 and the low-pressure groove 272 are formed in a substantially rectangular shape.

In addition, a circumferential dimension L22 of the low-pressure groove 272 is longer than a circumferential dimension L21 of the high-pressure groove 271 (i.e., L21<L22). As a result, the opening area of the low-pressure groove 272 into which a fluid flows from the space on the outer diameter side of a sliding surface 207a is large.

In addition, a radial dimension L24 of the low-pressure groove 272 is substantially the same as a radial dimension L23 of the high-pressure groove 271 (i.e., L23=L24). In other words, the low-pressure groove 272 is formed larger in axial-view area than the high-pressure groove 271.

In addition, the high-pressure groove 271 extends to a position on the outer diameter side as compared with the middle of the sliding surface 207a in the radial direction, and the low-pressure groove 272 extends to a position on the inner diameter side as compared with the middle of the sliding surface 207a in the radial direction. In other words, the high-pressure groove 271 and the low-pressure groove 272 are formed such that most thereof overlap in the circumferential direction.

As a result, the fluid that has flowed between the sliding surfaces 207a and 8a out of the high-pressure groove 271 or the low-pressure groove 272 upstream in the circumferential direction as a result of dynamic pressure generation easily flows into the high-pressure groove 271 or the low-pressure groove 272 adjacent on the downstream side at that time. Not only is it easy for a fluid film to be formed by the fluid over the circumferential direction between the sliding surfaces 207a and 8a, but also the fluid on a land 279 is likely to be supplied into the high-pressure groove 271 or the low-pressure groove 272.

Fourth Embodiment

Next, a high-pressure groove 371 and a low-pressure groove 372 of a side seal 307 as a sliding component according to a fourth embodiment of the present invention will be described with reference to FIG. 11. It should be noted that the description of configurations identical to those of the first embodiment will be omitted for redundancy avoidance.

Figure 11:
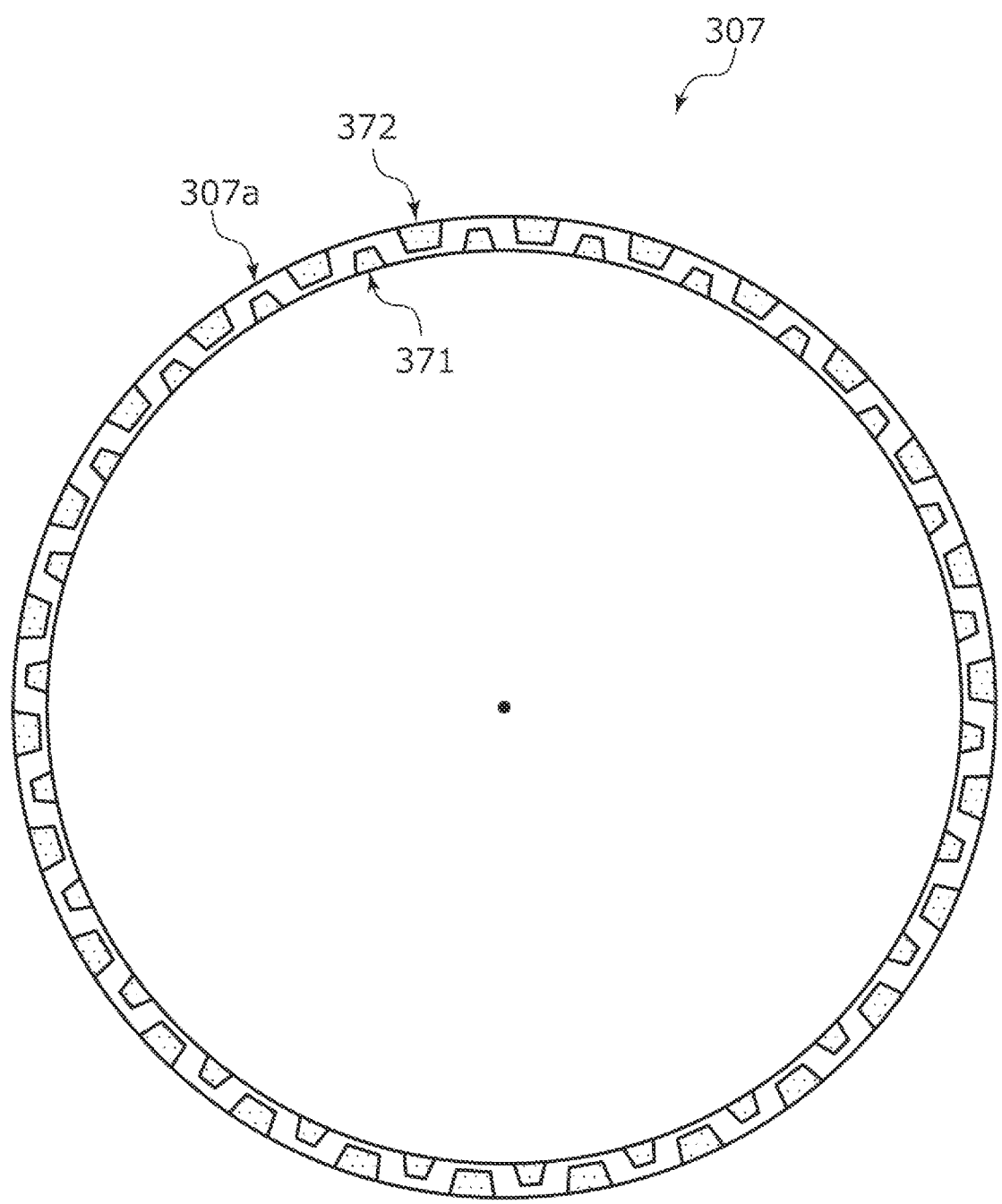
FIG. 11 is a diagram illustrating a sliding surface of a side seal as a sliding component according to a fourth embodiment of the present invention.

As illustrated in FIG. 11, the high-pressure groove 371 and the low-pressure groove 372 are formed in a substantially isosceles trapezoidal shape, and the low-pressure groove 372 is formed larger in axial-view area than the high-pressure groove 371.

Specifically, each of the high-pressure groove 371 and the low-pressure groove 372 is formed in a substantially isosceles trapezoidal shape having the largest circumferential dimension in the inner and outer openings. As a result, a large axial-view area is ensured at the land part between the high-pressure groove 371 and the low-pressure groove 372 adjacent to each other in the circumferential direction. The fluid that has flowed between a sliding surface 307a and the sliding surface 8a out of the high-pressure groove 371 or the low-pressure groove 372 as a result of dynamic pressure generation is likely to stay at the land part. Accordingly, it is possible to enhance sealability while ensuring the lubricity between the sliding surfaces 307a and 8a during sliding.

Although embodiments of the present invention have been described above with reference to the drawings, the specific configurations are not limited to the embodiments and any changes or additions within the scope of the present invention are included in the present invention.

Although an aspect in which a side seal as a sliding component is applied to a scroll compressor used in the air conditioning system of an automobile or the like has been described in the embodiments, the present invention is not limited thereto and the side seal as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In the first embodiment, the high-pressure groove 71 is formed in a circular shape having the center P1 at the innermost diameter of the sliding surface 7a and the wall surface 71a is formed in a substantially semicircular arc shape. However, the present invention is not limited thereto. The high-pressure groove may be any insofar as the wall surface is continuous in a circular arc shape. For example, the high-pressure groove may be formed in a semi-elliptical shape and the wall surface may have a circular arc shape. It should be noted that the same applies to the low-pressure groove 72.

In each of the embodiments, the low-pressure groove is formed larger in axial-view area than the high-pressure groove. However, the present invention is not limited thereto. The low-pressure groove may have the same axial-view area as the high-pressure groove or may be smaller in axial-view area than the high-pressure groove. It should be noted that in this case, balancing may be performed such that substantially the same dynamic pressure is generated in a range of 360 degrees over the circumferential direction between the sliding surfaces by forming more low-pressure grooves than high-pressure grooves.

In addition, insofar as the sliding component of the present invention has a sliding surface that relatively slides with eccentric rotation, the sliding component of the present invention may be used in an environment in which the pressure inside the sliding surface and the pressure outside the sliding surface are substantially equal to each other without being limited to an environment in which there is a pressure difference between the inside and outside of the sliding surface. In addition, the sliding component of the present invention does not have to function as a seal and may be one capable of stably reducing the frictional resistance of a sliding surface.

In addition, although the side seal having the relatively sliding surface is made of resin and the thrust plate is made of metal in the embodiments, the material of the sliding component may be freely selected in accordance with the environment of use and so on.

In addition, although an aspect in which a high-pressure groove and a low-pressure groove are formed in the sliding surface of the side seal has been described in the embodiments, the present invention is not limited thereto. A groove may be formed in the sliding region of the sliding surface of the thrust plate (see FIG. 4), which is a sliding component having a sliding surface relatively sliding with eccentric rotation. In addition, grooves may be formed in both the sliding surface of the side seal and the sliding surface of the thrust plate.

In addition, although a configuration in which the sliding surface of the side seal as a sliding component and the sliding surface of the thrust plate slide relative to each other with eccentric rotation has been described in the embodiments, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In addition, in a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

In the embodiments, the side seal has been described as a configuration that is annular in an axial view. However, the present invention is not limited thereto and the side seal may be formed in a disk shape in an axial view.

REFERENCE SIGNS LIST

1 Housing
2 Rotary shaft
2a Eccentric portion
3 Inner casing
4 Scroll compression mechanism
6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll
42 Movable scroll
50 Back pressure chamber
71 High-pressure groove
72 Low-pressure groove
79 Land
107 Side seal (sliding component)
171 High-pressure groove
172 Low-pressure groove
207 Side seal (sliding component)
271 High-pressure groove
272 Low-pressure groove 307 Side seal (sliding component)
371 High-pressure groove
372 Low-pressure groove
C Scroll compressor
M Drive motor
P1 Center of high-pressure groove
P2 Center of low-pressure groove

The invention claimed is:

1. An eccentric sliding assembly comprising:
a first sliding component having an annular shape with high-pressure and low-pressure fluids facing inside and outside of the sliding component and having a sliding surface,
a second sliding component having a sliding surface which is slidable with the sliding surface of the first sliding component;
an eccentric driving device configured to drive the sliding surface of the first sliding component relative to the sliding surface of the second sliding component such that a center of the first sliding component imaginarily draws a circle which is eccentric with respect to a center of the second sliding component while keeping a non-rotation state of the first sliding component with respect to the center of the first sliding component in a plan view, or configured to drive the sliding surface of the second sliding component relative to the sliding surface of the first sliding component such that the center of the second sliding component imaginarily draws a circle which is eccentric with respect to the center of the first sliding component while keeping a non-rotation state of the second sliding component with respect to the center of the second sliding component in the plan view;
wherein the sliding surface of the first sliding component has a radial width smaller than a radial width of the sliding surface of the second sliding component,
the sliding surface of at least the first sliding component is provided with a plurality of high-pressure grooves open to a space in which the high-pressure fluid exists and a plurality of low-pressure grooves open to a space in which the low-pressure fluid exists, and
the high-pressure grooves and the low-pressure grooves are arranged in a circumferential direction.

2. The eccentric sliding assembly according to claim 1, wherein in a plan view parallel to the sliding surface of the first sliding component, an area of the low-pressure groove is larger than an area of the high-pressure groove.

3. The eccentric sliding assembly according to claim 2, wherein the high-pressure grooves and the low-pressure grooves are disposed alternately inside and outside of the sliding surface of the first sliding component.

4. The eccentric sliding assembly according to claim 2, wherein the high-pressure grooves and the low-pressure grooves each are equiangularly arranged in the circumferential direction.

5. The eccentric sliding assembly according to claim 2, wherein each of the high-pressure grooves and each of the low-pressure grooves have a shape formed from a part of a circle.

6. The eccentric sliding assembly according to claim 2, wherein the space in which the low-pressure fluid exists in is a space on an outer diameter side of the sliding surface of the first sliding component.

7. The eccentric sliding assembly-according to claim 1, wherein the high-pressure grooves and the low-pressure grooves are disposed alternately inside and outside of the sliding surface of the first sliding component.

8. The eccentric sliding assembly according to claim 7, wherein the high-pressure grooves and the low-pressure grooves each are equiangularly arranged in the circumferential direction.

9. The eccentric sliding assembly according to claim 7, wherein each of the high-pressure grooves and each of the low-pressure grooves have a shape formed from a part of a circle.

10. The eccentric sliding assembly according to claim 7, wherein the space in which the low-pressure fluid exists in is a space on an outer diameter side of the sliding surface of the first sliding component.

11. The eccentric sliding assembly-according to claim 1, wherein the high-pressure grooves and the low-pressure grooves each are equiangularly arranged in the circumferential direction.

12. The eccentric sliding assembly according to claim 11, wherein each of the high-pressure grooves and each of the low-pressure grooves have a shape formed from a part of a circle.

13. The eccentric sliding assembly according to claim 11, wherein the space in which the low-pressure fluid exists in is a space on an outer diameter side of the sliding surface of the first sliding component.

14. The eccentric sliding assembly according to claim 1, wherein each of the high-pressure grooves and each of the low-pressure grooves have a shape formed from a part of a circle.

15. The eccentric sliding assembly according to claim 14, wherein the space in which the low-pressure fluid exists in is a space on an outer diameter side of the sliding surface of the first sliding component.

16. The eccentric sliding assembly according to claim 1, wherein the space in which the low-pressure fluid exists in a space on an outer diameter side of the sliding surface of the first sliding component.

* * * * *